(12) United States Patent
Chen et al.

(10) Patent No.: US 9,942,956 B1
(45) Date of Patent: Apr. 10, 2018

(54) BOOST CONVERTER DESIGN WITH 100%-PASS MODE FOR WLED BACKLIGHT AND CAMERA FLASH APPLICATIONS

(71) Applicant: Texas Instruments Incorporated, Dallas, TX (US)

(72) Inventors: Wenliang Chen, Plano, TX (US); Eung Jung Kim, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 15/395,611

(22) Filed: Dec. 30, 2016

(51) Int. Cl.
*H05B 33/08* (2006.01)
*H02M 3/158* (2006.01)
*H05B 37/02* (2006.01)

(52) U.S. Cl.
CPC ........ *H05B 33/0815* (2013.01); *H02M 3/158* (2013.01); *H05B 37/02* (2013.01)

(58) Field of Classification Search
CPC ............ H05B 33/0845; H05B 33/0812; H05B 33/0815; H05B 33/0809; H05B 33/0837; H05B 33/0851; H02J 7/007; H02J 7/0068; H02J 7/345; H01M 16/00; G03B 15/05
USPC ........ 315/247, 224, 291, 294, 307, 312, 360
See application file for complete search history.

(56) References Cited

U.S. PATENT DOCUMENTS

| | | | |
|---|---|---|---|
| 8,217,626 B2 * | 7/2012 | Winger | H02J 7/0068 307/20 |
| 9,414,450 B2 * | 8/2016 | van den Broeke | H05B 33/0815 |
| 9,544,485 B2 * | 1/2017 | Conner | H05B 33/0833 |
| 2017/0245337 A1 * | 8/2017 | Mishra | H05B 33/0851 |
| 2017/0256974 A1 * | 9/2017 | Baker | H02J 7/0068 |

OTHER PUBLICATIONS

Texas Instruments, "TPS63000—High Efficient Single Inductor Buck-Boost Converter with 1.8-A Switches," Datasheet, Jul. 2008, 24 pages.
Richtek, "RT 9986—7-CH DC/DC Converter for DSC," Datasheet, May 2011, 24 pages.

* cited by examiner

*Primary Examiner* — Haissa Philogene
(74) *Attorney, Agent, or Firm* — Lawrence J. Bassuk; Charles A. Brill; Frank D. Cimino

(57) ABSTRACT

Embodiments of the invention improve efficiency and address the stability issues that arise when a boost converter is used for both backlight WLEDs and camera flash applications, which require increased voltage or output voltage less than input voltage. In prior solutions, boost converters may suffer poor efficiency when operating in a fixed high output voltage mode or may lose stability by not properly regulating their output when operating in a step-down voltage mode. To improve efficiency of the boost converter, the present invention uses a 100%-pass mode topology when the battery voltage is high enough to support the diode voltage required for the backlight WLEDs or the camera flash. On the other hand, when the battery voltage drops below the required voltage, then the converter switches automatically to boost mode to generate a sufficient output voltage to drive the diodes to the required current level.

20 Claims, 3 Drawing Sheets

BOOST CONVERTER DESIGN WITH 100%-PASS MODE FOR WLED BACKLIGHT AND CAMERA FLASH APPLICATIONS

BACKGROUND

In portable devices, such as smartphones and tablets, batteries provide power for lighting both the display screen and camera flash. The display screen is typically backlit using one or more White Light Emitting Diodes (WLED). The camera flash is typically a single LED. These devices may be powered, for example, by a lithium-ion battery with a usable range of 2.7V to 4.35V. Depending upon the number, quality, and operating parameters of diodes used in the display and camera flash, the battery voltage may need to be increased or decreased to drive the diodes.

A boost converter is a step-up DC-to-DC power converter that increases the voltage from the input source to the output load. A boost converter typically includes at least two switches, such as a diode and a transistor, and at least one energy storage element, such as an inductor. The transistor is used to periodically connect an energy source, such as a battery, directly to the energy storage element to store energy into the energy storage element. The energy storage element causes the converter to output a voltage higher than the input DC voltage of the energy source. The diode prevents the DC current in the output from flowing backwards. A boost converter can be used to drive multiple WLED diodes to backlight a display using a battery. When the output voltage requirement is less than the input voltage, such as when the diode voltage is less than the battery voltage, a boost converter is not desirable since the driving efficiency is poor or the voltage drop may cause an unstable condition.

A buck converter is a step-down DC-to-DC power converter that lowers the voltage from an input source, such as a battery, to an output load. To provide voltages over a range of voltages that are both higher than and lower than a battery power source, a combined buck-boost converter may be used. However, a typical buck-boost converter uses four bulky switching field-effect transistors (FETs) with extra biasing circuits for controlling the four FETs. This requires additional silicon area in the device. The buck-boost converter also introduces switching losses when integrated with a switching charger or power supply in the device.

In other solutions, two independent circuits are used to drive the back-light WLED diodes and the camera flash LED. A boost converter may be used for driving multiple WLED diodes, and a low-dropout (LDO) regulator may be used for driving a single WLED diode. When two separate circuit topologies are used, the design becomes more complex due to different PIN out connections with different digital controls to drive the different numbers of diodes and a larger PCB footprint.

SUMMARY

Embodiments of the invention improve efficiency and address stability issues that arise when a boost converter is used for both backlight WLEDs and camera flash applications, which require increased voltage or output voltage less than input voltage. In prior solutions, boost converters may suffer poor efficiency when operating in a fixed high output voltage mode or may lose stability by not properly regulating their output when operating in a step-down voltage mode. To improve efficiency and address the stability issues of the boost converter, the present invention uses a 100%-pass mode topology when the battery voltage is high enough to support the diode voltage required for the backlight WLEDs or the camera flash. On the other hand, when the battery voltage drops below the required voltage, then the converter switches to boost mode to generate a sufficient output voltage (e.g., diode voltage and headroom for an LED driver (~250 mV)) to drive the diodes to the required current level.

An example circuit for WLED backlight and camera flash applications comprises a boost converter comprising an input having an input voltage, an output having an output voltage, and an inductor; a driver circuit for one or more diodes coupled to the output, the driver circuit generating a diode voltage; a maximum-voltage selector configured to select a regulation point for the output voltage; and a pass-mode circuit configured to bypass the boost converter when the diode voltage is less than the input voltage. The circuit may be incorporated into a smartphone or tablet, for example, and may be used to power one or more diodes used for display backlighting and/or a camera flash.

The maximum-voltage selector may select a regulation point based upon the input voltage and the diode voltage. The regulation point causes the boost converter to generate an output voltage that is greater than the diode voltage by a predetermined voltage. The predetermined voltage corresponds, for example, to a driver circuit's headroom voltage.

The pass-mode circuit may be further configured to monitor an inductor voltage and to prevent bypassing the boost converter when the inductor voltage is more than a predetermined voltage.

The boost converter may further comprise a low-side switch and a high-side switch. The switches are switching on and off alternatively to regulate the output voltage. The boost converter steps up the input voltage when the low-side switch is on and the high-side switch is off. On the other hand, the boost converter sends stored energy from an inductor to the output when the low-side switch is off and the high-side switch is on. In the 100%-pass mode, the switches are not switching and the boost converter is bypassed when the low-side switch is always turned off and the high-side switch is always turned on.

Another example circuit for WLED backlight and camera flash applications comprises a boost convertor having a low-side switch controlled by a low-side driver circuit; an inductor coupled between the low-side switch and an input having an input voltage; an output diode coupled to a node located between the inductor and the low-side switch and to an output having an output voltage; and a high-side switch controlled by a high-side driver circuit and coupled across the output diode. The circuit further comprises a maximum-voltage selector configured to select a value for the output voltage; and a pass-mode circuit configured to bypass the boost converter by closing the high-side switch when a target voltage is less than the input voltage.

The maximum-voltage selector selects the value for the output voltage based upon the input voltage and the target voltage. The value for the output voltage that is greater than the target voltage by a predetermined voltage. The circuit may further comprise a diode driver circuit coupled to the output, wherein the predetermined voltage corresponds to a driver circuit's headroom voltage.

The pass-mode circuit may be further configured to monitor a voltage across the inductor and to prevent bypassing the boost converter when the inductor voltage is more than a predetermined voltage.

The circuit may further comprise a driver circuit for one or more diodes coupled to the output, and a display backlit by the one or more diodes and/or a diode functioning as a camera flash. The circuit may be incorporated into a smartphone or tablet to power a display backlight or a camera flash.

A method for powering one or more diodes used in a WLED backlight or camera flash application comprises selecting a maximum voltage value by comparing an input voltage to a diode voltage; regulating a boost converter circuit to generate an output voltage that is a predetermined amount greater than the maximum voltage value; and comparing the input voltage to the diode voltage. When the input voltage is less than the diode voltage, the boost converter circuit is allowed to generate the output voltage. When the input voltage is greater than the diode voltage, the boost converter circuit is bypassed so that the output voltage is equivalent to the input voltage less voltage drop across circuit components.

The boost converter may comprise a low-side switch controlled by a low-side driver circuit; an inductor coupled between the low-side switch and an input having an input voltage; an output diode coupled to a node located between the inductor and the low-side switch and to an output having an output voltage; and a high-side switch controlled by a high-side driver circuit and coupled across the output diode.

The method may further comprise bypassing the boost converter by closing the high-side switch when the diode voltage is less than the input voltage.

The method may further comprise monitoring a voltage across the inductor; and preventing the boost converter bypass when the inductor voltage is more than a predetermined voltage.

BRIEF DESCRIPTION OF THE DRAWINGS

Figure 1:
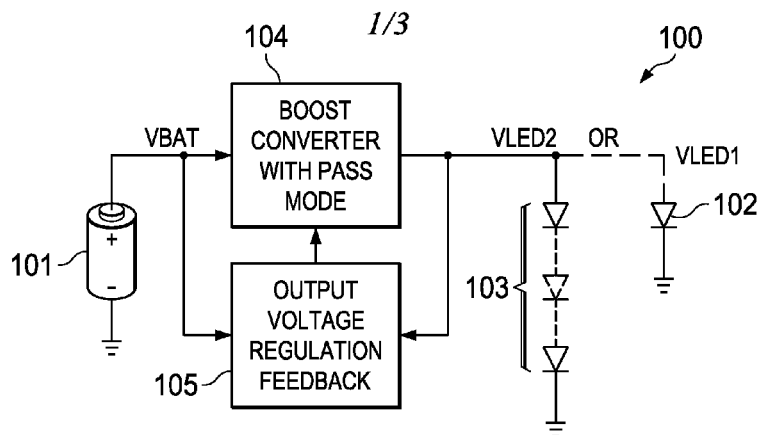

Having thus described the invention in general terms, reference will now be made to the accompanying drawings, wherein:

FIG. 1 is a block diagram illustrating a device having a boost converter with a 100%-pass mode according to one embodiment.

Figure 2:
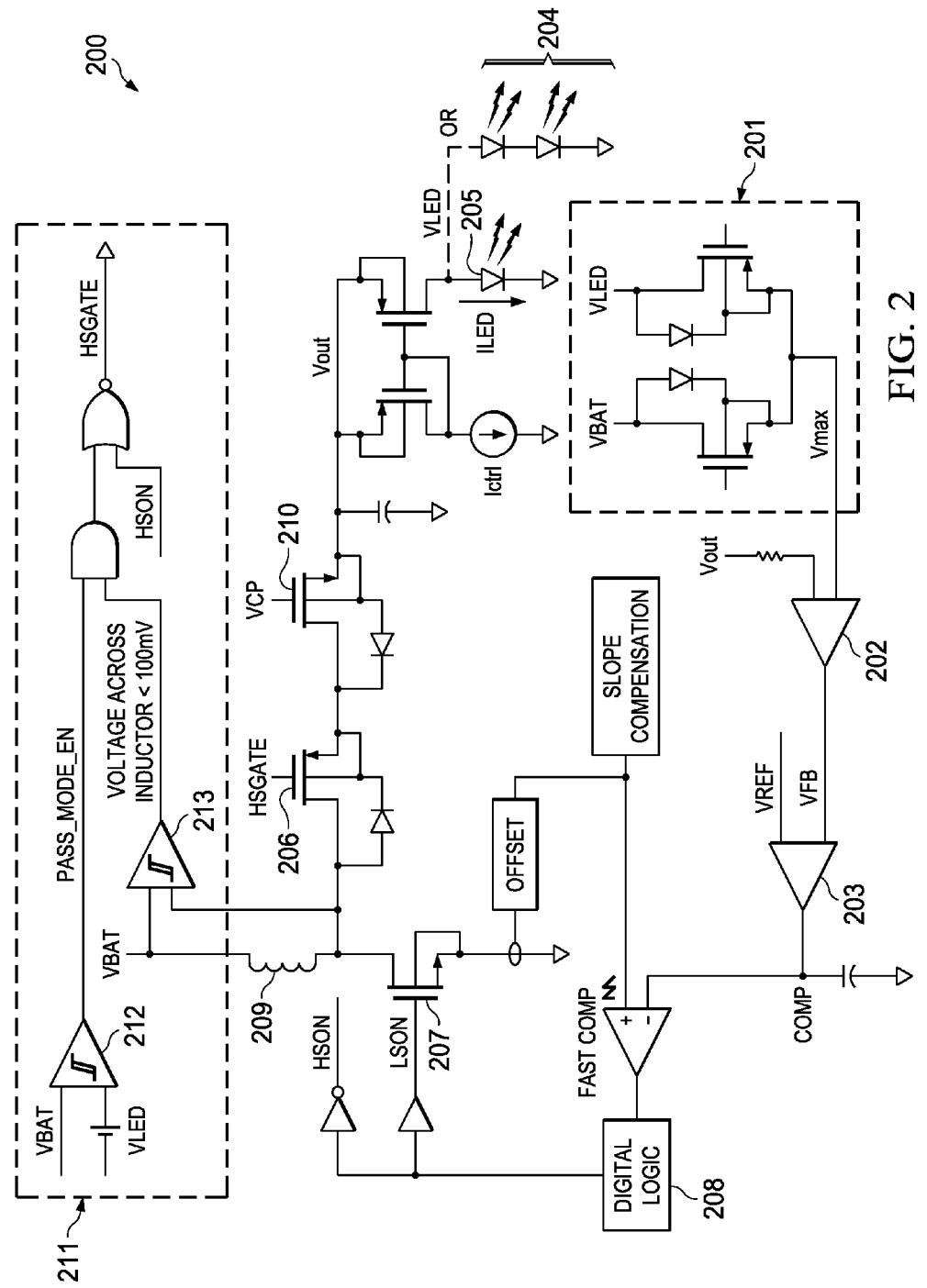

FIG. 2 is a schematic diagram of a boost converter having a 100%-pass mode according to one embodiment.

Figure 3:
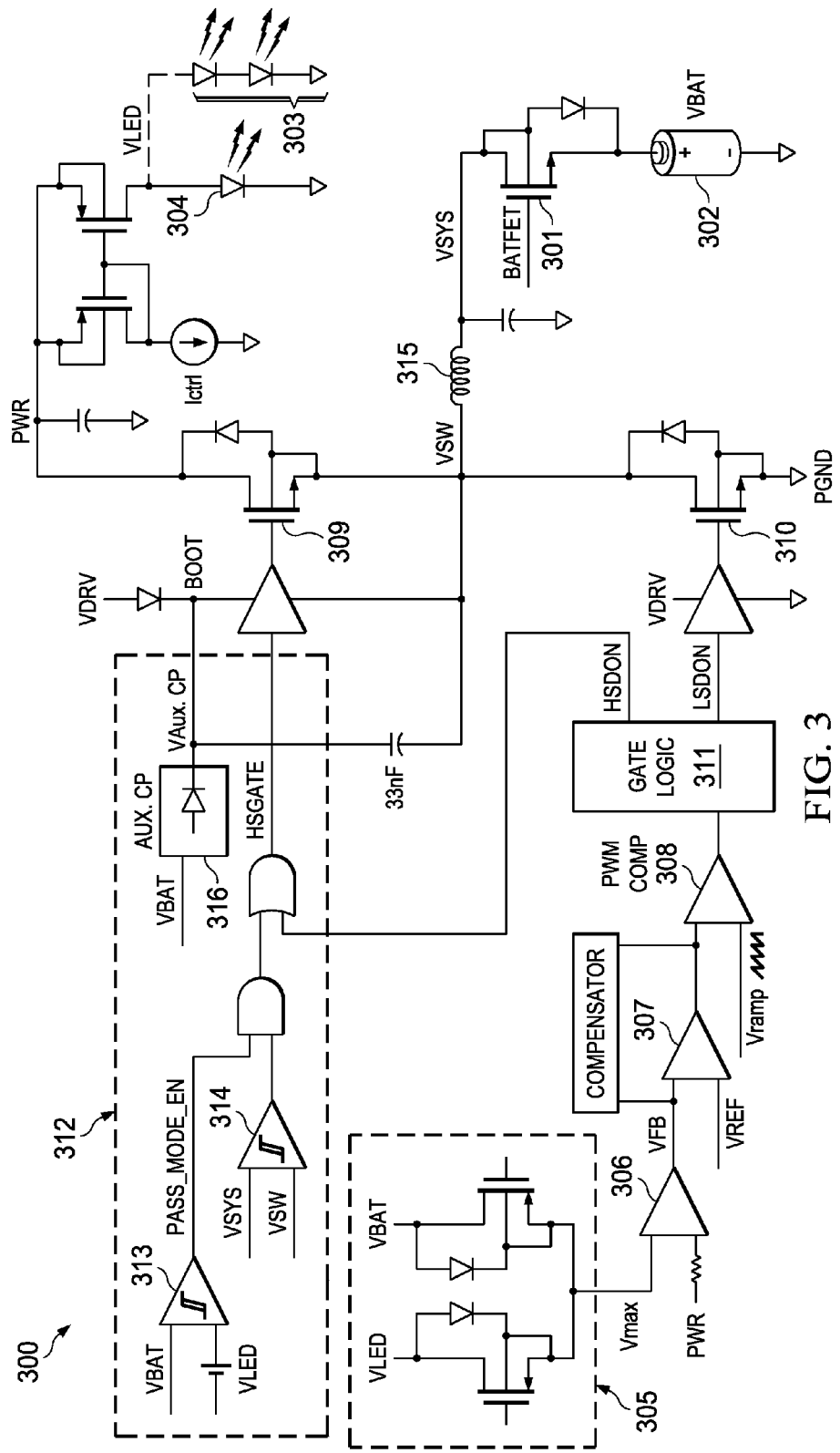

FIG. 3 is a schematic diagram of a switching charger with integrated reverse boost converter having a 100%-pass mode for driving diodes according to one embodiment.

Figure 4:
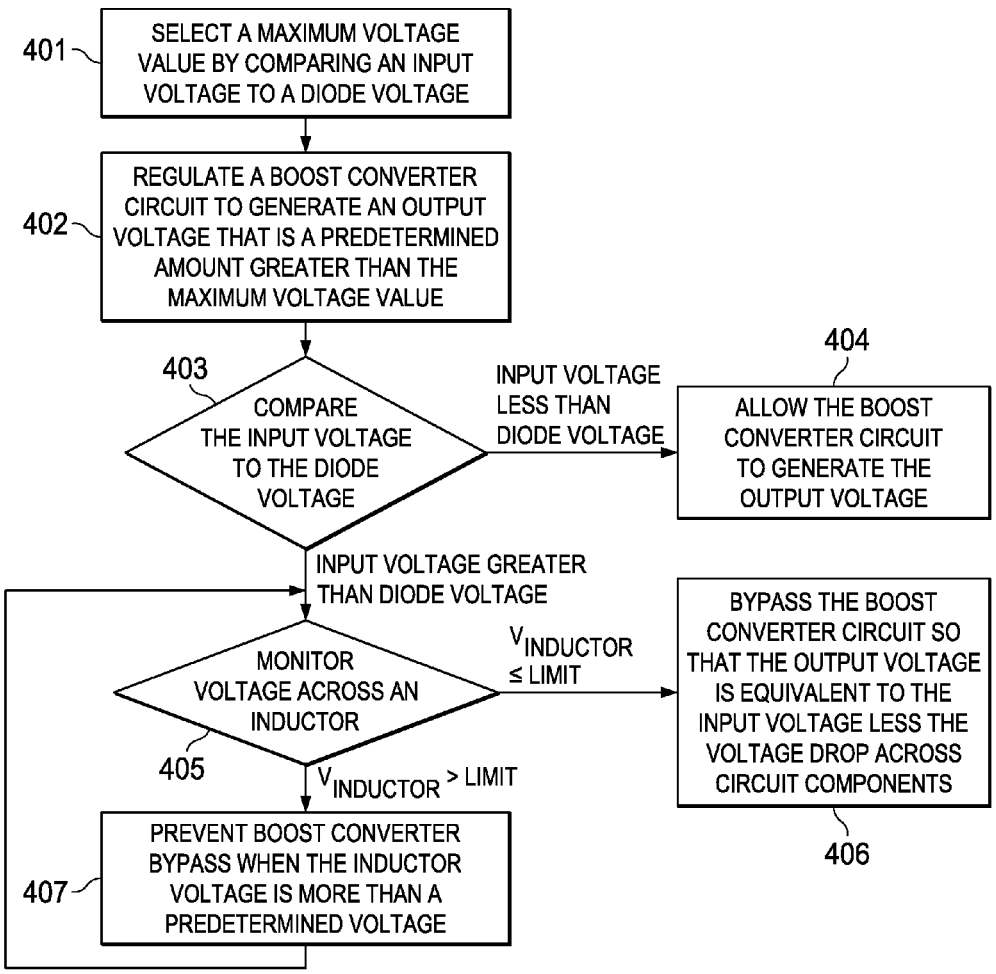

FIG. 4 is a flowchart illustrating an example method for powering one or more diodes according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating a device 100 having a boost converter with a 100%-pass mode according to one embodiment. A battery 101 provides power to diodes, which may be used for a display back-light or as a camera flash. There may be a single diode 102, such as for a camera flash, or a series of two or more diodes 103, such as for display backlighting. The size of the display may determine how many diodes 103 are required, but other factors, such as product budget, may determine the number and quality of diodes 103. Battery 101 may be a lithium-ion battery, for example, with an operating voltage (VBAT) in the range 2.7-4.35 volts depending upon the charge level. In an example embodiment, depending on the selected brightness level, each of the diodes may require 2.7-4.1 volts. Accordingly, the voltage required across single diode 102 (VLED1) may be in the range of 2.7-4.1V. In the case of two series diodes 103, the voltage required across diodes 103 (VLED2) may be in the range of 5.4-8.2V. Generally, it is desirable to maintain the proper voltage across—and uniform current through—diodes 102, 103 so that the diodes produce a constant light level without regard to actual battery state.

When the voltage required by the diodes is greater than the voltage of the battery (i.e., VBAT<VLED), then boost converter 104 is used to step-up the battery voltage to the required level. An output voltage regulation feedback circuit 105 is used to determine the required voltage (VLED1 or VLED2) and to maintain the output of boost converter 104 at or above the battery voltage. In device 100, when the required voltage is less than the battery voltage (i.e., VBAT>VLED), then a 100%-pass mode circuit acts to bypass boost converter 104 so that the diodes 102, 103 are powered by the battery 101. This avoids instability caused by operating boost converter 104 in a step-down mode and does not require separate buck converter or LDO circuits.

FIG. 2 is a schematic diagram of a boost converter 200 having a 100%-pass mode according to one embodiment. A Vmax selector 201 is used to select the proper output voltage regulation point to guarantee a stable boost condition in which the output of the boost converter (Vout) is always greater than the battery voltage (VBAT). The Vmax selector 201 has two inputs. One input is the battery voltage (VBAT), and the other input is the diode voltage (VLED). The output of Vmax selector 201 is the maximum voltage (Vmax) of the two voltages —either VBAT or VLED.

Vmax and Vout are fed into amplifier 202 to generate feedback voltage (VFB). The feedback voltage is compared to a reference voltage (VREF) in amplifier 203. Boost converter 200 applies internal frequency compensation and regulates its output voltage (Vout) to be higher than the Vmax voltage by a certain fixed offset voltage (e.g., 250 mV) so that Vout is always greater than the input (i.e. Vout>VBAT) and driving efficiency is high. The boost converter comprises a high-side (HS) switch 206 and a low-side (LS) switch 207. The HS switch 206 and LS switch 207 are switching on and off alternatively to regulate the boost converter output voltage. The boost converter steps up the input voltage when the low-side switch 207 is on and the high-side switch 206 is off. The boost converter sends stored energy from an inductor to the output when the low-side switch 207 is off and the high-side switch 206 is on. HS switch 206 and LS switch 207 are controlled by signals HSON and LSON, respectively, from digital logic 208. HS switch 206 includes additional logic (HSGATE) described below.

For the applications that require driving back-light series WLEDs 204, a fixed, constant current is passed through the diodes, which generates uniform back-light for the display. The current passing through diodes 204 determines the back-light brightness. The value of Vout decreases as the number of diodes 204 decreases. For example, Vout may be as high as 24V for a string of seven WLEDs 204. On the other hand, Vout may be as low as 3.3V for a single WLED diode 205. The boost converter design illustrated in FIG. 2 guarantees that Vout will be higher than VBAT plus some offset voltage for stable boost operation.

The same boost converter design 200 can also be used for driving single LED diodes 205 for camera flash applications in portable devices as well as for the display in those devices. Only one diode 205 is used for camera flash applications, but it may use different current levels. As the current level decreases, the diode voltage (VLED) decreases, thus the required boost converter Vout voltage decreases. If the Vout drops below boost converter's input voltage (i.e., VBAT), then the boost converter would lose regulation and may become unstable. For example, when VBAT is 4.35V, the diode voltage (VLED) could be as low as 2.7V for a diode current of less than 200 mA, which would result in VBAT (e.g., 4.35V) being greater than Vout (e.g., 2.95V=2.7V+250 mV for headroom voltage of the current mirror). To prevent the unstable condition, the boost converter design shown in FIG. 2 guarantees stable operation across the whole battery voltage range.

If the boost mode is used to drive single diode 205 when VBAT (e.g., 4.2V) is much greater than VLED (e.g., 2.7V), then the boosted output voltage will be much greater than VLED (e.g., Vout=VBAT+Voffset=4.2+0.25=4.45V>>2.7V). In this situation, the efficiency of the LED driver suffers significantly since the power loss is equal to (Vout−VLED)×ILED. Given that (Vout−VLED)=[(VBAT+Voffset)−VLED)]=(4.45−2.7)=1.75V, which is a relatively larger voltage drop, this results in a poor efficiency number.

To improve efficiency, boost converter 200 enters a 100%-pass mode when the required output voltage is less than the battery voltage (i.e., VLED<VBAT). In the 100%-pass mode, HS switch 206 and LS switch 207 are not switching. Instead, the boost converter is bypassed and power is delivered to the diode driver with high-side (HS) switch 206 always turned on and low-side (LS) switch 207 always turned off. With this configuration, Vout is equal to VBAT−ILED×R_series (where R_series=(equivalent series resistance of inductor 209)+(Rds_on of HS switch 206)+(Rds_on of blocking FET 210)+(parasitic resistance of any PCB traces and connectors)). Since Vout is equal to VBAT minus the I×R voltage drops and is not equal to the boosted output voltage, driving the LED diodes using the battery in this configuration will improve efficiency significantly.

In 100%-pass mode circuit 211, comparator 212 compares VBAT to VLED (i.e., the diode voltage plus some offset voltage) and generates the pass-mode enable signal when VLED is less than VBAT. For protection purposes, before entering the 100%-pass mode, comparator 213 monitors the voltage drop across the inductor 209. This ensures that most of the stored energy in inductor 209 is gone so that no inductor-current spike is present when switching from boost mode to the 100%-pass mode. When the pass-mode enable signal is high and the voltage across inductor 209 is less than 100 mV, for example, then the HSGATE signal turns on HS switch 206 to connect VBAT to the diode driver circuitry. In the 100%-pass mode, an auxiliary charge pump is used to take care of any leakage current in order to keep the HS switch 206 on all the time. The charge pump voltage powers the driver of the HS switch 206.

On the other hand, if the VLED voltage is significantly greater than VBAT, then the pass-mode-enable signal will be low, which will cause circuit 200 to enter normal boost mode so that Vout is high enough to provide the voltage required to drive the diodes. Comparators 212 and/or 213 provide hysteresis to prevent oscillation during mode transition between the 100%-pass and boost modes. Switch 210 is used to shut off the diodes completely when no lighting is desirable at the output.

FIG. 3 is a schematic diagram of a switching charger with integrated reverse boost converter 300 having a 100%-pass mode for driving diodes according to one embodiment. Depending on the state of battery switch 301, battery 302 may be charged by an outside power source (PWR) or battery is used to power diodes 303, 304. In the latter case Vmax selector 305 is used to select the proper output voltage regulation point to guarantee a stable boost condition (i.e., wherein the output of the boost converter (PWR) is always greater than VBAT). The Vmax selector 305 has two inputs. One input is the battery voltage (VBAT), and the other input is the diode voltage (VLED). The output of Vmax selector 305 is the maximum voltage (Vmax) of the two voltages—either VBAT or VLED.

Vmax and PWR are fed into amplifier 306 to generate feedback voltage (VFB). The feedback voltage is compared to a reference voltage (VREF) in amplifier 307. Boost converter 300 applies internal frequency compensation 308 and regulates its output voltage (PWR) to be higher than the Vmax voltage by a certain fixed offset voltage (e.g., 250 mV) so that PWR is always greater than the input (i.e. PWR>VBAT). The boost converter comprises a high-side (HS) switch 309 and a low-side (LS) switch 310. The HS switch 309 and LS switch 310 are switching on and off alternatively to regulate the boost converter output voltage. The boost converter steps up the input voltage when the low-side switch 310 is on and the high-side switch 309 is off. The boost converter sends stored energy from an inductor to the output when the low-side switch 310 is off and the high-side switch 309 is on. HS switch 309 and LS switch 310 are controlled by signals HSDON and LSDON, respectively, from digital logic 311. HS switch 309 includes additional logic (HSGATE) described below.

For the applications that require driving back-light WLEDs 303, a fixed, constant current is passed through diodes 303 in series, which generates uniform back-light for portable devices. The voltage at PWR decreases as the number of diodes 303 decreases. The boost converter design illustrated in FIG. 3 guarantees that the PWR voltage will be higher than VBAT plus some offset voltage for stable boost operation.

Switching-charger, boost converter 300 can be used for driving single LED diode 304 for camera flash applications. As the current level decreases, the diode voltage (VLED) decreases, thus the boost converter's output voltage (PWR) decreases. If the PWR drops below boost converter's input voltage (i.e. the battery voltage, VBAT), then the boost converter would lose regulation and may become unstable. To prevent the unstable condition, the same boost converter design can be used with the Vmax selector to guarantee PWR>VBAT for stable boost operation across the whole battery voltage range.

To increase efficiency, switching-charger, boost converter 300 enters a 100%-pass mode when the required output voltage is less than the battery voltage (i.e., VLED<VBAT). In this mode, the HS switch 309 will be turned on and LS switch 310 will be turned off. In 100%-pass mode circuit 312, comparator 313 compares VBAT to VLED and generates the pass-mode enable signal when VLED is less than VBAT. For protection purposes, before entering the 100%-pass mode, comparator 314 monitors the voltage drop across the inductor 315. This ensures that most of the stored energy in inductor 315 is gone so that no inductor-current spike is present when switching from boost mode to the 100%-pass mode. When the pass-mode enable signal is high and the voltage across inductor 315 has dissipated, then HS switch 309 is turned on to connect VBAT and PWR to directly drive the diodes.

In the 100%-pass mode, an auxiliary charge pump 316 is used to take care of any leakage current in order to keep HS switch 309 on all the time. The input voltage of the charge pump 316 is VBAT, which is used to generate a regulated charge pump voltage VAuxCP based on charge transfer principle. The VAuxCP voltage powers the driver of the HS switch 309.

On the other hand, if the VLED voltage is significantly greater than VBAT, then the pass-mode-enable signal will be low to cause circuit 300 to enter normal boost mode so that PWR is high enough to provide the voltage required to drive the diodes with regulated current. Comparators 313 and/or 314 provide hysteresis to prevent oscillation during mode transition between the 100%-pass and boost modes.

The embodiments described herein provide a simple, compact PCB footprint to cover the applications for driving single or multiple diodes. While the examples above refer to WLEDs used in display backlighting and camera flash diodes, it will be understood that the present invention may be used to drive any other components that may require varying voltage and current levels. No matter how many components or diodes are required, the circuits disclosed herein may be used to provide the required power levels with the need to modify the circuit for different applications. The solution can cover WLED or camera flash diodes with different forward diode voltages (e.g., typical diode voltage ranges from 2.7 to 4.1V or wider ranges). There is no constraint on diode voltage used with the design. The topology in the invention can switch between boost switching mode and 100% pass-mode automatically, thus it supports all commercially available diodes or other components.

The embodiments disclosed herein are capable of supporting the entire available voltage range of a lithium-ion or other battery to drive WLED and camera flash LED diodes for stable converter operations. Prior solutions do not cover the entire voltage range of the battery and require multiple different configurations to support different numbers of diodes. Additionally, the embodiments disclosed herein provide a simplified topology that occupies less silicon area.

The automatic switching scheme disclosed herein allows for switching between boost and 100%-pass modes to provide optimal performance in terms of driver stability and efficiency. Using this topology, devices can avoid the situation in which the input voltage of a boost converter is greater than the output voltage. If the input voltage is significantly greater than the required diode voltage, then the device will enter the 100%-pass mode to improve efficiency. Alternatively, the boost converter will enter the boost mode if the input voltage is less than the required voltage to support the attached components plus headroom voltage.

FIG. 4 is a flowchart illustrating an example method for powering one or more diodes according to one embodiment. In step 401, a maximum voltage value is selected by comparing an input voltage to a diode voltage. In step 402, a boost converter circuit is regulated to generate an output voltage that is a predetermined amount greater than the maximum voltage value. In step 403, the input voltage is compared to the diode voltage. When the input voltage is less than the diode voltage, the boost converter circuit is allowed to generate the output voltage in step 404.

When the input voltage is greater than the diode voltage, the voltage across an inductor is monitored in step 405. If the inductor voltage at or below a predetermined limit, then the boost converter circuit is bypassed in step 406 so that the output voltage is equivalent to the input voltage less the voltage drop across circuit components. Alternatively, if the inductor voltage is greater than the limit in step 405, then the boost converter bypass is prevented in step 407 until the inductor voltage is less than a predetermined voltage.

The boost converter may comprise, for example, a low-side switch controlled by a low-side driver circuit, an inductor coupled between the low-side switch and an input having an input voltage, an output diode coupled to a node located between the inductor and the low-side switch and to an output having an output voltage, and a high-side switch controlled by a high-side driver circuit and coupled across the output diode. Bypassing the boost converter in step 406 may be achieved by closing the high-side switch when the diode voltage is less than the input voltage.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A circuit, comprising:
a boost converter comprising an input having an input voltage, an output having an output voltage, and an inductor;
a driver circuit for one or more diodes coupled to the output, the driver circuit generating a diode voltage;
a maximum-voltage selector configured to select a regulation point for the output voltage; and
a pass-mode circuit configured to bypass the boost converter when the diode voltage is less than the input voltage.

2. The circuit of claim 1, wherein the maximum-voltage selector selects a regulation point based upon the input voltage and the diode voltage.

3. The circuit of claim 2, wherein the regulation point causes the boost converter to generate an output voltage that is greater than the diode voltage by a predetermined voltage.

4. The circuit of claim 3, wherein the predetermined voltage corresponds to a driver circuit's headroom voltage.

5. The circuit of claim 1, wherein the pass-mode circuit is further configured to monitor an inductor voltage and to prevent bypassing the boost converter when the inductor voltage is more than a predetermined voltage.

6. The circuit of claim 5, wherein the boost converter comprises a low-side switch and a high-side switch, and wherein the boost converter is bypassed by stopping switching action of the switches and turning the high-side switch on all the time.

7. The circuit of claim 1, wherein the boost converter comprises a low-side switch and a high-side switch, wherein the switches are switched on and off alternatively to regulate a boost converter output voltage.

8. The circuit of claim 1, further comprising at least one of:
a display backlit by the one or more diodes; and
the one or more diodes functioning as a camera flash.

9. The circuit of claim 8 incorporated into a smartphone or tablet.

10. A circuit, comprising:
a boost convertor comprising:
- a low-side switch controlled by a low-side driver circuit;
- an inductor coupled between the low-side switch and an input having an input voltage;
- an output diode coupled to a node located between the inductor and the low-side switch and to an output having an output voltage; and
- a high-side switch controlled by a high-side driver circuit and coupled across the output diode;

a maximum-voltage selector configured to select a value for the output voltage; and
a pass-mode circuit configured to bypass the boost converter by stopping the switching action of the switches and turning on the high-side switch all the time when a target voltage is less than the input voltage.

11. The circuit of claim 10, wherein the maximum-voltage selector selects the value for the output voltage based upon the input voltage and the target voltage.

12. The circuit of claim 11, wherein the value for the output voltage that is greater than the target voltage by a predetermined voltage.

13. The circuit of claim 12, further comprising:
a diode driver circuit coupled to the output, wherein the predetermined voltage corresponds to a driver circuit's headroom voltage.

14. The circuit of claim 10, wherein the pass-mode circuit is further configured to monitor a voltage across the inductor and to prevent bypassing the boost converter when the inductor voltage is more than a predetermined voltage.

15. The circuit of claim 10, further comprising:
a driver circuit for one or more diodes coupled to the output; and
at least one of:
- a display backlit by the one or more diodes, and
- the one or more diodes functioning as a camera flash.

16. The circuit of claim 10 incorporated into a smartphone or tablet to power a display backlight or a camera flash.

17. A method for powering one or more diodes, comprising:
selecting a maximum voltage value by comparing an input voltage to a diode voltage;
regulating a boost converter circuit to generate an output voltage that is a predetermined amount greater than the maximum voltage value; and
comparing the input voltage to the diode voltage,
when the input voltage is less than the diode voltage, allowing the boost converter circuit to generate the output voltage, and
when the input voltage is greater than the diode voltage, bypassing the boost converter circuit so that the output voltage is equivalent to the input voltage less a voltage drop across circuit components.

18. The method of claim 17, wherein the boost converter comprises:
a low-side switch controlled by a low-side driver circuit;
an inductor coupled between the low-side switch and an input having an input voltage;
an output diode coupled to a node located between the inductor and the low-side switch and to an output having an output voltage; and
a high-side switch controlled by a high-side driver circuit and coupled across the output diode.

19. The method of claim 18, further comprising:
bypassing the boost converter by stopping the switching action of the switches and turning on the high-side switch all the time when the diode voltage is less than the input voltage.

20. The method of claim 18, further comprising:
monitoring a voltage across the inductor; and
preventing the boost converter bypass when the inductor voltage is more than a predetermined voltage.

* * * * *